United States Patent [19]

Wobick et al.

[11] Patent Number: 4,688,669

[45] Date of Patent: Aug. 25, 1987

[54] ELEVATOR BUCKET FOR HIGH SPEED OPERATION

[75] Inventors: Robert F. Wobick, West Milwaukee; William B. Anderson, Oconomowoc; Louis F. Counter, Greendale; Phil M. Dindinger, Greenfield, all of Wis.

[73] Assignee: Rexnord Inc., Brookfield, Wis.

[21] Appl. No.: 702,697

[22] Filed: Feb. 19, 1985

Related U.S. Application Data

[63] Continuation of Ser. No. 365,217, Apr. 5, 1982, abandoned.

[51] Int. Cl.⁴ .............................................. B65G 17/36
[52] U.S. Cl. ..................................... 198/712; 198/713
[58] Field of Search .............................. 198/712-714, 198/711

[56] References Cited

U.S. PATENT DOCUMENTS

| | | | |
|---|---|---|---|
| 212,317 | 2/1879 | Mey | 198/714 |
| 336,916 | 3/1886 | Haigh | 198/713 |
| 414,483 | 11/1889 | Avery | 198/714 |
| 998,678 | 7/1911 | Dowling | 198/714 X |
| 1,109,986 | 9/1914 | Harrison | 198/712 |
| 2,944,657 | 7/1960 | Davis et al. | 198/713 |
| 4,129,209 | 12/1978 | Mayfeld | 198/712 |

FOREIGN PATENT DOCUMENTS

| | | | |
|---|---|---|---|
| 1805815 | 5/1970 | Fed. Rep. of Germany | 198/712 |
| 284036 | 1/1928 | United Kingdom | 198/714 |

*Primary Examiner*—Joseph E. Valenza
*Assistant Examiner*—Jonathan D. Holmes
*Attorney, Agent, or Firm*—Richard C. Ruppin

[57] ABSTRACT

A bucket for attachment to the chain in a mill duty bucket elevator, includes a one piece wrapper member bent into a U-shaped trough defined by a sloping front wall, a horizontal bottom wall, an upright rear wall, a forwardly sloping rear wall, and a horizontal top lip. A rectangular hole in the wrapper plate defines the outside edges of a chain channel in which the chain lies when the bucket is fastened to the chain. Four side pieces having identical shapes and outside dimensions lie transversely across the trough to provide two end walls and two inside partitions. The partitions brace the front wall and act as side walls of the chain channel. A back plate fastened to the partitions and to the top lip and bottom wall adjacent the rectangular hole acts as the front face of the chain channel. The top lip, fastened to the two end walls and the two partitions, provides torsional stiffness to the bucket.

6 Claims, 8 Drawing Figures

ELEVATOR BUCKET FOR HIGH SPEED OPERATION

This application is a continuation of application Ser. No. 365,217, filed Apr. 5, 1982, now abandoned.

BACKGROUND OF THE INVENTION

This invention relates to elevator buckets, and more particularly to a cantilevered bucket for a mill duty elevator.

A mill duty bucket elevator is an equipment system for lifting dense, flowable substances from a low elevation to a higher elevation. It is designed to withstand the severe service conditions imposed by the handling of materials such as cement, rock, fertilizer, lime, gypsum, pyrites, slag, coal, and fine ore.

A bucket elevator is made of a long endless chain loop trained around an upper traction wheel and a lower sprocket wheel. A series of buckets is attached to the chain at regular intervals for conveying material from one end of the elevator to the other end. The elevator is usually vertically oriented and operates in a casing having a feed chute for filling the buckets near the bottom or boot of the casing, and a discharge chute into which the buckets discharge their contents near the top or the head of the casing. The maximum height of a elevator is determined by the weight and strength of the chain, the density of the material to be carried, and the size and weight of the buckets.

Prior art elevator buckets have, in some circumstances experienced a short fatigue life. We have concluded, after analysis and testing, that the cause of fatigue failure in elevator buckets is due to resonant vibration of the buckets caused by impact of the chain bushings with the traction wheel.

The resonant vibration in the bucket, as it passes over the traction wheel, causes internal stresses in the bucket which are concentrated at several regions in the bucket. These stresses result in the initiation of fatigue cracks at these points of high stress, and these cracks propagate through the joints and corners of the bucket adjacent to its attachment point on the chain. Although no liability attaches to the manufacturer because of the use in conditions exceeding the specified limits for which the elevator was designed, these situations can create bad will for the company. Accordingly, it is considered desirable to design the buckets in such a way that they are resistant to fatigue cracking under all conditions of use.

One technique for lengthening the service life of elevator buckets is to provide vibration isolation mounting devices between the bucket and the chain. This scheme could probably be made to work, but suitable vibration isolation mounts for this application are excessively costly considering the number of buckets in an elevator, which can amount to as many as 400 buckets on a single chain. Therefore, we decided that a less costly and more durable solution to the fatigue cracking problem would be a redesign of the bucket itself to better enable it to withstand the vibration without developing fatigue cracks at points of stress.

One problem with bucket redesign for an existing elevator configuration is that the buckets must be compatible with the existing elevator design. This is because it would be extremely costly to redesign an elevator for a new bucket configuration. More importantly, the new bucket should be compatible with the thousands of existing elevators, so that when the buckets of the present design in these existing elevators wear out, they may be replaced with the improved buckets to improve the performances and operation of the old elevators.

In addition to improving the fatigue life, it would be desirable to improve the buckets in other ways. For example, the redesigned bucket should be easier and faster to fabricate, use lighter gauge materials, have fewer different pieces, and more easily meet critical dimensions. The improved bucket should be lighter, thereby making it possible to build elevators of greater height. Finally, if possible, the improved bucket should provide a larger capacity bucket while remaining dimensionally compatible with the existing elevators, and thereby improve the capacity of the elevator.

SUMMARY OF THE INVENTION

Accordingly, it is an object of this invention to provide a method for manufacturig a bucket for a mill duty elevator that is resistant to the fatigue effects of vibration, is light weight, and is inexpensive to produce. Another object of this invention is to provide a light weight bucket for a mill duty elevator that is resistant to the fatigue effects of vibration and is inexpensive to produce. Yet another object of this invention is to provide a bucket that can be fabricated of few different parts and whose critical dimensions are more easily attained.

These and other objects of the invention are attained in an elevator bucket having laterally extending braces from the front lip to the back wall, and a longitudinally extending bar along the top rear lip to provide torsional stiffness. A preferred embodiment made according to the invention has a trough shaped wrapper member forming the front, bottom and upper and lower back walls of the bucket and also forming the top stiffening bar. A hole cut in the wrapper member in the portions which form the back and bottom walls provides an opening which defines the edges of a chain channel. Four identical plates form two outside walls of the bucket and two inside partitions extending across the cross-sectional U-shape of the channel adjacent the hole in the wrapper plate. The inside partitions function as sides of the chain channel and as the laterally extending front lip braces. A back plate is fastened to the inside partitions and to the wrapper plate adjacent the top and bottom edges of the hole in the wrapper plate to form the front wall of the chain channel.

DESCRIPTION OF THE DRAWINGS

The invention and its many attendant objects and advantages will become better understood by reading the following description of the preferred embodiment in conjunction with the following drawings, wherein.

DESCRIPTION OF THE PREFERRED EMBODIMENT

Figure 1:
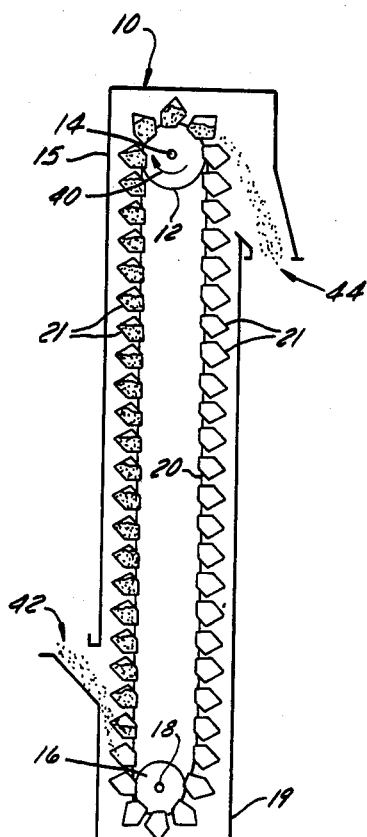
FIG. 1 is a schematic of a mill duty bucket elevator for which the buckets of this invention were designed.

Referring now to the drawings wherein like reference characters designate identical parts, and more particularly to FIG. 1 thereof, a mill duty bucket elevator for which the buckets of this invention were designed is shown having a casing 10 enclosing the moving components of the elevator which include a top traction wheel or sprocket 12 mounted on a supporting shaft 14 journaled in end bearings (not shown) on the casing head 15, and a bottom sprocket wheel 16 mounted on a supporting shaft 18 also journaled in end bearings in a gravity take-up (not shown) in the casing boot 19. A long continuous loop of chain 20 is supported vertically at its top by the traction wheel 12, and is guided at its bottom by the sprocket wheel 16. The traction wheel, shown more clearly in FIG. 2, the formed of a hub 22 to which rim segments 24 of hardened steel are fastened by bolts 26.

Figure 3:
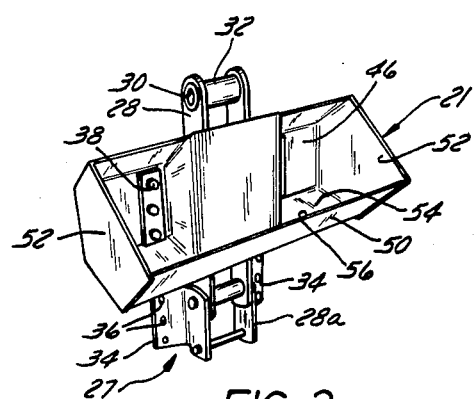
FIG. 3 is a perspective view of a prior art bucket and portion of the chain of the elevator shown in FIG. 1.
Figure 2:
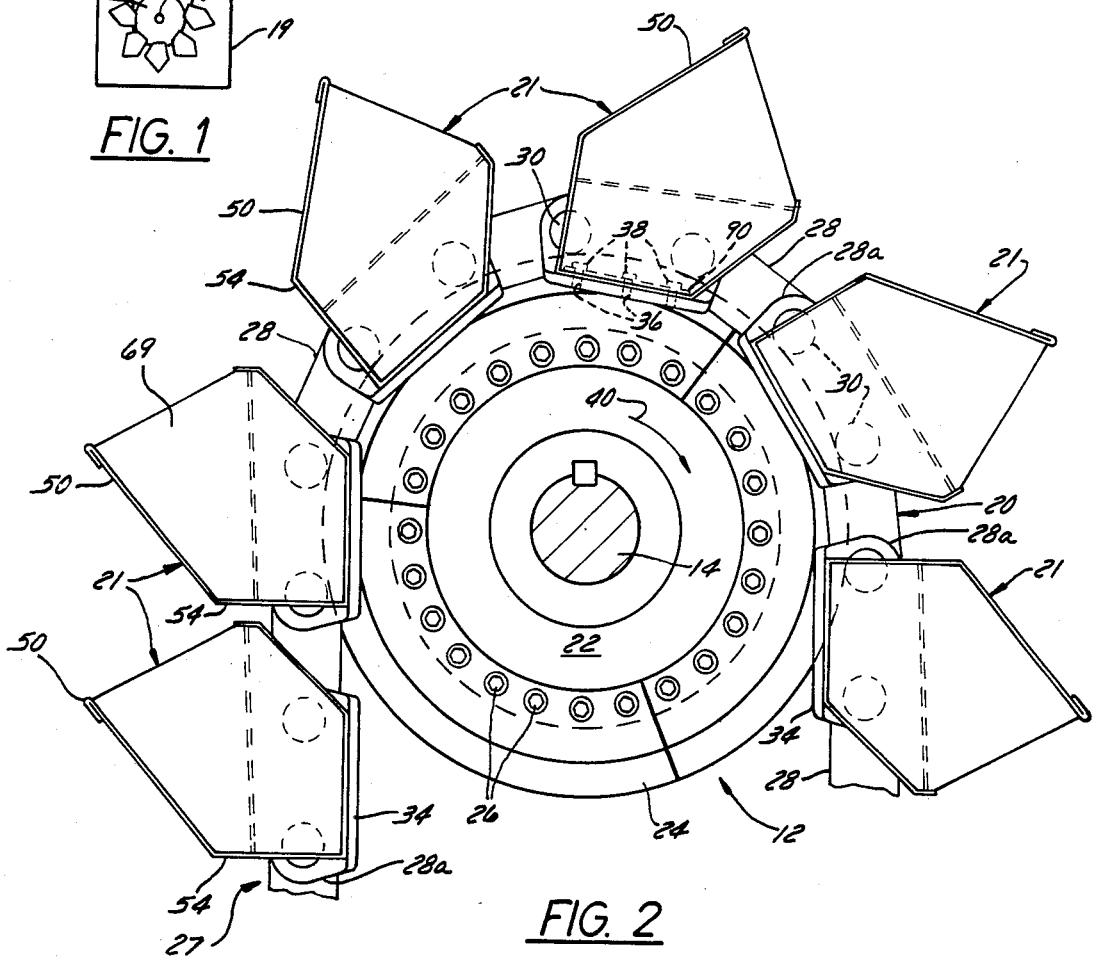
FIG. 2 is an elevation of the top portion of the bucket elevator shown in FIG. 1 showing some of the details of the buckets and the traction wheel over which the chain is trained.
Figure 4:
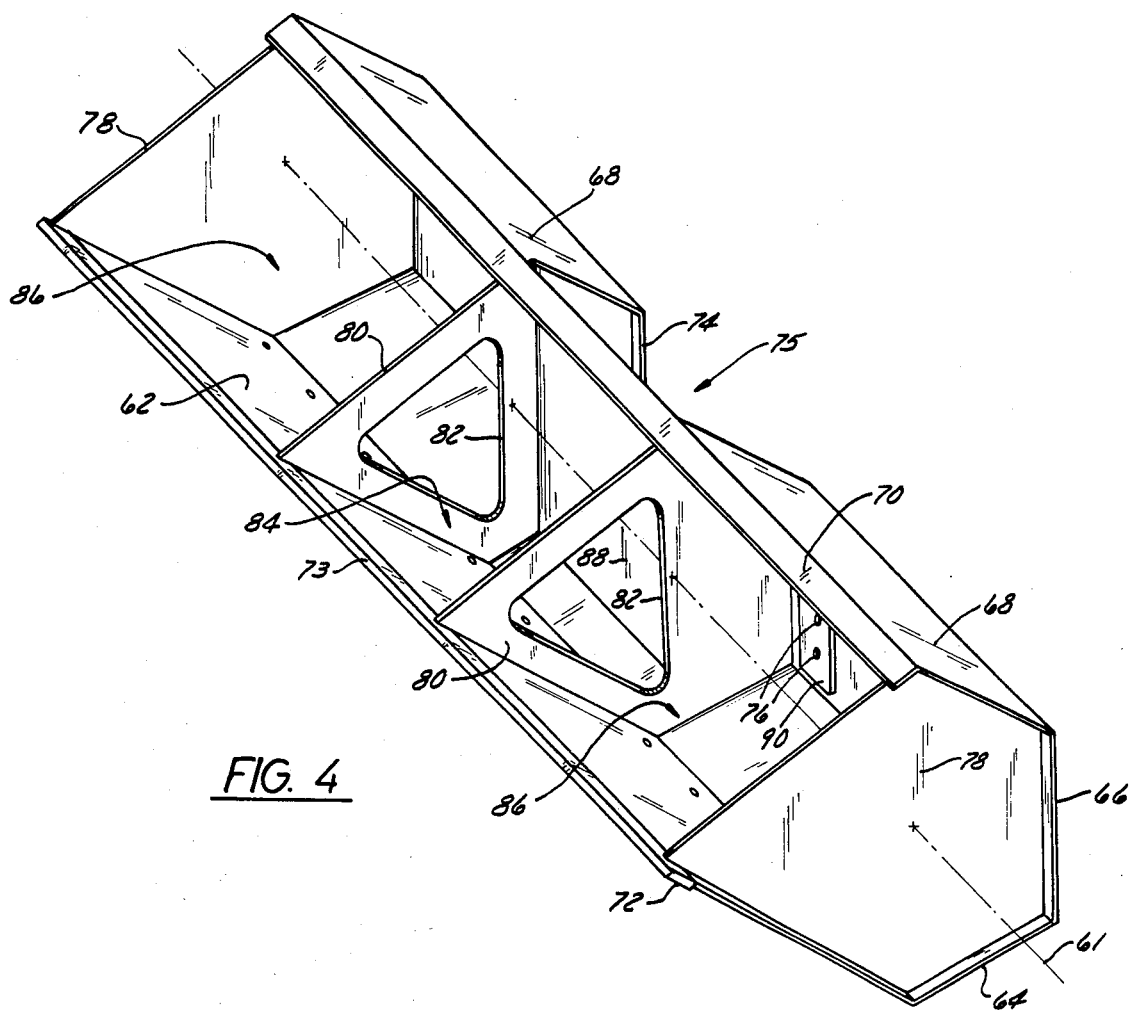
FIG. 4 is an enlarged perspective view of the bucket of this invention.
Figure 8:
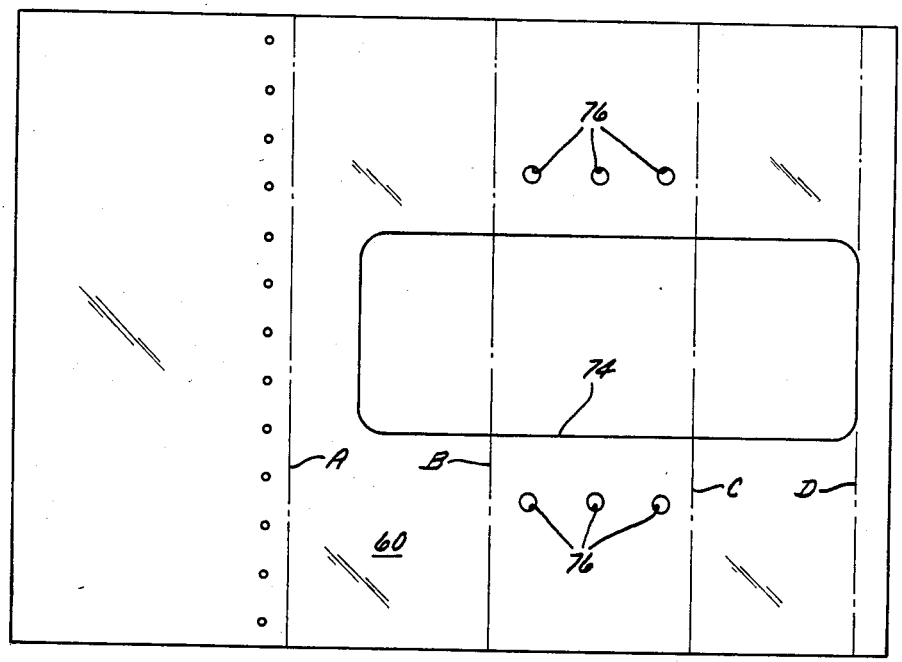
FIG. 8 is a flat developed view of the wrapper plate for the bucket of this invention.
Figure 5:
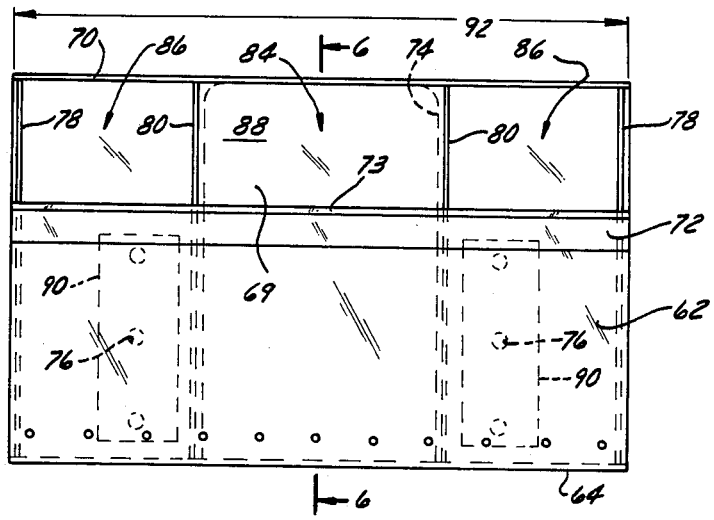
FIG. 5 is a front elevation of the bucket shown in FIG. 4.
Figure 6:
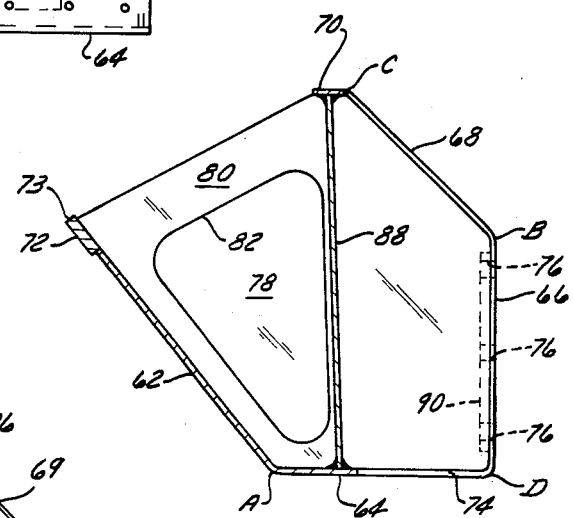
FIG. 6 is a sectional elevation along lines 6—6 in FIG. 5.
Figure 7:
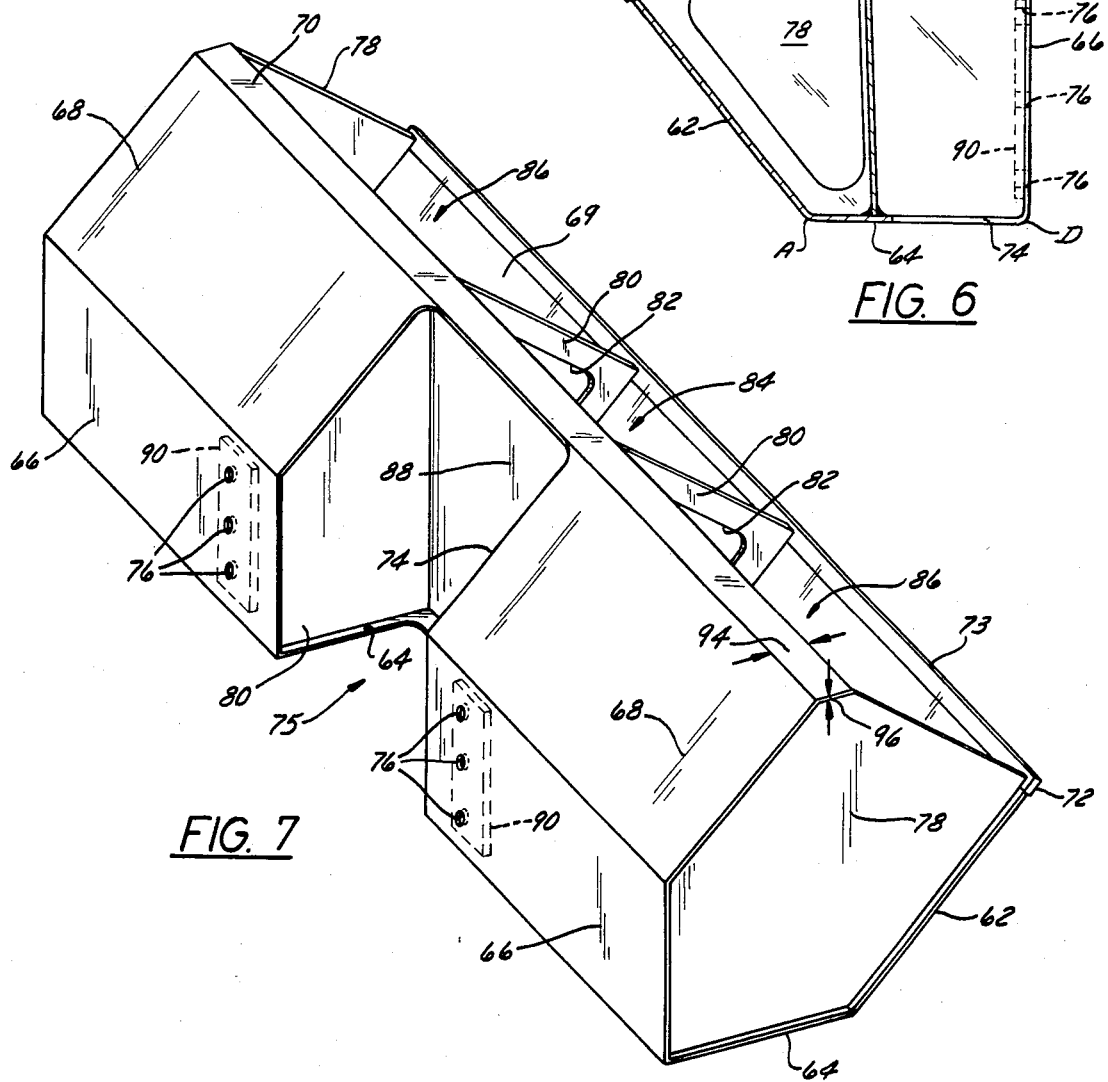
FIG. 7 is a rear perspective view of the bucket shown in FIG. 4.

As shown in FIGS. 2 and 3, the chain 20 is formed of chain members 27 comprising parallel chain links 28 connected together by pins 30 and held in parallel spaced relationship by chain bushings 32. Alternate pairs of chain links 28a are disposed on the outside of every other pair of chain links 28, and the outside links 28a are provided with mounting flanges 34. The mounting flanges 34 each have three holes 36 disposed in parallel, vertically aligned axes to receive bolts 38 which are used to secure the buckets 21 to the flanges 34.

In general, the operation of the bucket elevator is as follows: the shaft 14 of the traction wheel 12 is driven by an electric motor thru a gear box and chain drive, not shown, to rotate the traction wheel 12 in the clockwise direction as shown by arrow 40. The material to be elevated is fed into the elevator through an entry chute 42 and falls into the open topped buckets 21. The buckets are formed with a forwardly sloping front wall to facilitate catching the incoming material from the entry chute 42 and to facilitate centrifugal discharge of the material at the exit chute 44 as explained below. The buckets 21 are spaced very closely together as shown. A bucket is attached to every other pair of chain links as shown in FIG. 2, and the chain bushings are typically six inches apart, so that buckets can be spaced about one every foot of the chain. As shown, this produces a very close spacing of the buckets, but the forwardly extending front wall and the inward velocity of the material falling into the casing through the entry chute 42 enables the buckets to fill despite the close vertical spacing along the chain 20.

As the buckets are carried by the chain over the top of the traction wheel 12, centrifugal force propels the contents out of the bucket and through the exit chute 44. The empty bucket then continues on down the rear flight of the chain loop and around the sprocket wheel 16 of the gravity takeup, which maintains correct chain tension and proper alignment of the chain in the casing boot 19.

Our theory to explain the short fatigue life that has sometimes been seen in the prior art bucket shown in FIG. 3 is as follows. When the bushings 32 of the ascending chain 20 reach the traction wheel 12, they strike the wheel with an impact that is a function of the chain speed, the chain tension, the chain pitch, and the hardness of the bushings and the wheel. The force of this impact is transmitted in the direction of the bucket through the chain mounting flanges 34 to the back wall 46 of the bucket 21 which is excited to a condition of resonance by the impact. The front wall 50 of the bucket 21 is supported by the bucket end walls 52 and bottom wall 54, but is unsupported along the entire length of the leading edge or lip 56 between the side walls 52. At the resonant condition of the bucket, the front wall 50 resonates like a drum head at its natural frequency. The inertial forces of the vibrating mass of the wall 50 tend to be high and must be carried by the attachment to the end and bottom walls. The resulting stress can be concentrated at upper corners of the chain channel and other high stress regions. Cracks can initiate at certain points in the bucket, typically at regions which are fixed against flexing, and these cracks can propagate through the channel members, sometimes resulting in loose or dislodged buckets. If the condition is not corrected, damage to the elevator casing and the remaining buckets could result.

The bucket of this invention, shown in FIGS. 47, includes a wrapper plate 60 which may be formed or bent in a trough or U-shaped section along bend lines A-D parallel to a longitudinal axis 61. The formed wrapper plate 60 has a length 92 and includes an outwardly sloping front wall 62, a lower floor 64, a vertical rear wall 66, and a forwardly sloping upper rear wall 68. The front wall 62 and upper rear wall 68 define an opening 69 in the U-shaped section through which material is received and discharged by the finished bucket. The wrapper plate 60 terminates in a narrow top rear reinforcing lip 70 preferably extending the full length of the formed plate 60. The lip 70 lies parallel to and spaced above the floor 64 and is positioned over the opening 69 such that the opening 69 is somewhat decreased in size. The reinforcing has a width 94 and thickness 96 transverse to the width 94 and which is of a smaller dimension than the width 94. The reinforcing lip 70 is preferably positioned with the width 94 generally parallel to the direction of force on the rear wall 66 due to the impact of the bushings 32 with the traction wheel 12. Thus, the reinforcing lip 70 has a bending stiffness that is greater in the direction of the force due to such impact than in a direction transverse to the direction of the force. In general, the positioning of the reinforcing lip 70, as shown in FIGS. 4–7, is such that it provides regidity to the bucket of a higher level in the direction of force received by the rear wall than in a direction at an angle to the direction of such force. A hardened steel wear bar 72 is welded to the front leading edge of the sloping front wall 62 and provides an abrasion resistant leading edge 73 to resist abrasive wear at the region of maximum wear inflicted by the incoming material from the entry chute 42. The opening 74 also has the effect of dividing the rear walls 66 and 68 into two separate sections which are connected by the reinforcing lip 70 bridging the opening 74 and providing structural continuity along the length of the bucket.

A rectangular opening 74 is formed in the wrapper plate 60 which, when bent into its trough shape as shown in FIGS. 4–7, provides the rearward opening for a vertical channel 75 in the bucket to receive the chain as shown in FIG. 3. A set of three mounting holes 76 is formed in a vertical line on each side of the opening 74 for receiving the mounting bolts by which the chain flanges 34 are fastened to the bucket.

Four side pieces, including two outer side pieces 78 and two inner side pieces 80, extend laterally across the trough shaped wrapper plate 60 perpendicular to the longitudinal axis 61 to close the ends of the trough and divide the interior into three compartments. The outer side pieces 78 and the inner side pieces 80 are all the same shape and all have identically dimensioned outside edges so that they can be cut from stacked sheet steel by digitally controlled flame cutting or plasma arc cutting equipment. These pieces could also be cut by shearing, stamping, or any other cutting technique. The inner side pieces 80 each have an additional opening 82 formed in their front central portion to allow material falling into the bucket from the casing entry chute 42 to flow from the center compartment 84 into the two side compartments 86. This is desirable because the inlet configuration is often about two thirds as wide as the bucket to prevent flooding the elevator boot, so that majority of the material initially flows into the center compartment 84.

The outer side pieces 78 are spaced slightly in from the extreme end edges of the wrapper plate 60 to provide a protruding lip on the wrapper plate 60 which forms an inside corner with the outer side pieces 78 to facilitate the formation of a secure and sound weld around the edge of the outer side pieces 78. Likewise, the inner side pieces 80 are spaced slightly outward from the edges of the opening 74 to provide an inside corner at which the inner side pieces 80 can be welded to the edges of the opening 74.

A rectangular back plate 88 is welded in a nearly vertical position between the top lip 70 and the floor 64 of the wrapper 60 adjacent the top and bottom edges of the opening 74. The sides of the rectangular back plate 88 are welded to the sides of the inner side pieces 80. In this manner, the rear face of the back plate 88 forms the front face of the vertical chain channel 75, and the rear portions of the inner side pieces 80 form the side faces of the chain channel 75.

The inner side pieces 80 also provide an important stiffening function for the sloping front wall 62 of the bucket and for the bucket as an entirety. The long cantilevered leading front edge 73 and indeed the entire front wall 62 of the bucket is now supported and stiffened by the inner side pieces 80 which shorten the effective length of the unsupported front edge to one-third. Therefore, the amplitude of the vibrations of the front wall 62 will be reduced considerably, and the stress experienced by the bucket at critical areas as a consequence of resonance will be less. The stiffening support of the front wall 62 is preferably attained by connecting the inner side pieces 80 to the rear wall 66 adjacent the attachment locations of the rear wall 66 to the flanges 34 of the chain 20. Consequently, the impacting force of the wheel 12 on the rear wall 66 is substantially directly opposed by the side pieces 80. As previously described, the rear top lip 70 is also positioned to provide an important torsional stiffness to the bucket to prevent torsional flexing and the accompanying stress cycling during loading of the bucket and also at chordal impact of the chain bushing with the traction wheel.

A bearing plate 90 is provided on the inside of the upright rear wall 66 of the wrapper plate 60 in the region of the mounting holes 76 to provide a thicker and stronger backing for the attachment bolts 38 which hold the bucket to the chain mounting flanges. The bearing plates 90 distribute the forces exerted on the rear wall 66 by the attachment bolts 38 over a wide area so the maximum stress is held within limits which provide an acceptable fatigue life.

The manufacture of the bucket is accomplished by cutting the wrapper plate 60 to its correct outside dimensions, cutting the opening 74, and punching the mounting holes 76. The rectangular plate thus formed is bent to the trough shaped form shown in FIGS. 4–7 by bending the edges along parallel lines in the order indicated by the letters A–D. It is important that the lower rear corner bend D be made last, otherwise the sides of the trough shaped member 60 will interfere with the press structure when the other bends are formed. The stops on the press must be set up carefully so that the bends are all parallel, otherwise the side pieces 78 and 80 will not all fit snuggly in the trough, and the bucket will not lie horizontal across the chain.

Once the wrapper member is properly bent, and the back plate 88 and side pieces 78 and 80 are cut, the welding can proceed. Automatically controlled submerged arc welding is preferred because of its speed and the quality of the quantities do not warrant the set up and equipment costs of the automatic welding operation.

Although the length of welding involved in the fabrication of buckets according to this invention is somewhat longer than the welding on prior art buckets, because of the need to weld the inner side pieces 80 in place, the additional cost of this additional welding can be substantially reduced by the use of automatic welding equipment mentioned. The savings from the use of lighter gauge material, the improved fatigue life, the higher speeds, and the greater elevator height made possible by the use of a lighter bucket and reduced sensitivity to chain bushing impact with the traction wheel more than make up for the additional cost of the additional welding.

The internal bracing provided by the inner side pieces 80 and the rear top lip 70 of this invention provide a bucket of great rigidity, so that lighter gauge material can be used. Prior art buckets for use in mill duty elevators were normally formed of seven gauge steel plate, but it was found that, because of the strength of this configuration, a much lighter gauge material can be used. A bucket of this configuration fabricated of ten to fourteen gauge steel sheet is stronger and more rigid than the prior art bucket design, and yet the weight of a bucket of this configuration is less than the weight of a prior art bucket of the same capacity. Therefore, the elevator can be extended to a greater height. The greater rigidity and lighter weight of this bucket enables it to tolerate the vibration and stresses incurred by high speed operation. The overall result from using this new bucket in the existing elevator design is a significant improvement in durability and operational efficacy.

The bucket of this invention also facilitates manufacturing efficiency, in that there are a fewer number of different parts used in this bucket design. Because of the use of a single piece wrapper plate 60 and the identical outside dimensions and shapes of the outer and inner side pieces 78 and 80, this bucket is formed of only four parts of different shapes. These are the wrapper plate 60, the inner and outer side pieces 78 and 80, the back plate 88, and the bearing plates 90. The wrapper plate 60, the bearing plates 90, and the back plate 88 are rectangular pieces and so the waste involved in the cutting of these pieces is minimal.

The bucket of this invention achieves the internal bracing of the front wall 62 and the torsional stiffening about the longitudinal axis 61 with the use of stiffeners which also provide other structural functions in the bucket. The top lip 70 is merely the terminal edge portion of the wrapper plate 60. It requires no additional fabrication or inventorying of parts, but provides an important attachment for the top edge of the back plate 88 and top edge of the inner side pieces 80, and even more importantly, it lends substnatial torsional stiffness to the bucket against flexing around the axis 61. Similarly, the inner side pieces 80 provide plural functions. They serve as the side walls for the chain channel 75, they stiffen the back wall 66 and sloping upper rear wall 68 of the wrapper plate 60 in the region of attachment to the chain, and they stiffen the front wall 62 to reduce the amplitude of resonant vibrations during filling with material and upon impact of the chain bushings with the traction wheel.

Obviously, numerous modifications and variations of the invention disclosed herein are possible and will occur to those skilled in the art in light of this disclosure.

Accordingly, it is expressly to be understood that these modifications and variations, and the equivalents thereof, may be practiced while remaining within the spirit of and scope of the invention as defined in the following claims, wherein we claim:

1. An elevator bucket for a mill duty elevator including a chain on which the bucket is attached and impacted as the chain moves, comprising:
   a trough shaped structure forming front, bottom and upper and lower rear walls extending parallel to a longitudinal axis;
   attachment means on regions of one of said upper and lower rear walls for attachment of said bucket to said elevator chain such that the bucket vibrates at its resonant frequency due to the impacting of the bucket at the attachment regions;
   two outer side pieces extending transversely of said longitudinal axis and closing the ends of said trough shaped structure;
   means in said bottom and rear walls defining an opening which constitutes the edges of a chain channel;
   two inner side pieces on either side of said opening extending laterally in said trough shaped structure and attached to said bottom and rear walls adjacent said opening to provide side walls for said chain channel;
   a back plate extending between and fastened to said inner side pieces and to said bottom wall to provide the forward wall for said chain channel;
   a torsion bar extending the full longitudinal length of said bucket along the top of said upper rear wall and said chain channel, the torsion bar being attached to the upper rear wall and attached at its ends to said outer side pieces, whereby torsional stiffness around the longitudinal axis of the bucket is increased to thereby reduce the amplitude of the resonant vibrations of the bucket and decrease the tendency of the bucket to crack due to the vibrations; and
   first and second laterally extending braces connected to said front wall near a leading lip thereof and operatively connected to the torsion bar and to the upper rear wall, the first and second lateral braces being respectively located adjacent a different one of the two regions of attachment of one of the rear walls to the chain members whereby the force due to the impacting of the bucket at the attachment regions is substantially directly opposed by the lateral braces and the bucket is stiffened to thereby reduce the amplitude of the resonant vibrations of the bucket and decrease the tendency of the bucket to crack.

2. The elevator bucket as defined in claim 1 wherein the bucket has a resonant vibration frequency amplitude which is less than the amplitude of the bucket without said first and second lateral braces.

3. An elevator bucket for a mill duty elevator having an upper support wheel and a lower guide wheel and an endless chain trained and movable around the wheels and including chain members impacted by the upper wheel as the chain moves around the upper wheel, the bucket being mounted on the chain and comprising:
   a trough shaped structure having a length and front, bottom and rear walls extending parallel to the length, and an opening defined by the front and rear walls, the rear wall comprising two spaced apart separate wall sections and a chain channel between the wall sections for receiving the chain on which the bucket is mounted, the rear wall being attached to a chain member whereby the rear wall receives the force due to the impact of the chain member with the upper wheel and transmits such force throughout the bucket such that the bucket vibrates at its resonant frequency;
   two outer side pieces extending transversely of said length, each being attached to a respective rear wall section and closing the ends of said trough shaped structure; and
   reinforcement means bridging the space between and being attached to the two separate rear wall sections and the two outer side pieces and extending the length of the bucket adjacent said opening for providing structural continuity along the length of the bucket and increasing the torsional stiffness of the bucket about its length and increasing the bending stiffness of the bucket in the direction of said force to thereby reduce the amplitude of the resonant vibrations of the bucket and the tendency of the bucket to crack.

4. The elevator bucket as defined in claim 3 wherein the reinforcement means comprises a member having a length, a width transverse to the length of the member, and a thickness transverse to and less than the width, the member being positioned with the width parallel to the direction of said force on the rear wall of the bucket.

5. The elevator bucket as defined in claim 3 further comprising inner side pieces extending laterally and connected to the front wall and the rear wall adjacent the attachment locations of the rear wall to the chain member, the reinforcing means extending along the top of the rear wall and the chain channel and being attached to the rear wall and to the inner and outer side pieces, the reinforcing means having a bending stiffness in the direction of said force that is greater than its bending stiffness transverse to the direction of the force whereby the combination of the torsional and bending stiffness provided by attachment of the reinforcing means to the rear wall and the inner and outer side pieces and the stiffening provided by attaching the inner side pieces adjacent the attachment locations of the bucket results in a further reduction in the amplitude of resonant vibrations of the bucket.

6. The elevator bucket as defined in claim 5 wherein the first and second inner side pieces each have an outer periphery attached to said front, bottom and rear walls and an inner periphery spaced from the outer periphery and defining an opening in each of the inner side pieces whereby material carried by the bucket can flow from the space between the inner side pieces to the spaces between the inner and outer side pieces.

* * * * *